(12) United States Patent
Claus (10) Patent No.: US 6,987,829 B2
(45) Date of Patent: Jan. 17, 2006

(54) NON-ITERATIVE ALGEBRAIC RECONSTRUCTION TECHNIQUE FOR TOMOSYNTHESIS

(75) Inventor: Bernhard Erich Hermann Claus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 125 days.

(21) Appl. No.: 10/663,309

(22) Filed: Sep. 16, 2003

(65) Prior Publication Data

US 2005/0058240 A1    Mar. 17, 2005

(51) Int. Cl.
*G01N 23/083*    (2006.01)
(52) U.S. Cl. ............................ 378/23; 378/22; 378/901
(58) Field of Classification Search .................... 378/4, 378/11, 15, 22, 23, 901
See application file for complete search history.

(56) References Cited

U.S. PATENT DOCUMENTS

| | | | |
|---|---|---|---|
| 6,256,370 B1 * | 7/2001 | Yavuz | 378/22 |
| 6,442,288 B1 * | 8/2002 | Haerer et al. | 382/128 |
| 6,707,878 B2 * | 3/2004 | Claus et al. | 378/22 |

* cited by examiner

*Primary Examiner*—David V Bruce
(74) *Attorney, Agent, or Firm*—Jean K. Testa; Christian G. Cabou (57) ABSTRACT

A method for obtaining a reconstruction of a tomographic dataset by filtering and combining the projection images, followed by a backprojection step. In one embodiment, the method can yield a reconstruction equivalent to an additive ART reconstruction, while in another embodiment the method represents a filtered back-projection type reconstruction. The computations do not require an iterative backprojection/re-projection step.

41 Claims, 6 Drawing Sheets

NON-ITERATIVE ALGEBRAIC RECONSTRUCTION TECHNIQUE FOR TOMOSYNTHESIS

TECHNICAL FIELD

The present invention relates generally to digital imaging, and more particularly to reconstructing a three-dimensional (3D) image from projections acquired using a tomosynthesis device.

BACKGROUND OF THE INVENTION

Tomosynthesis is an imaging modality where typically projection radiographs from only a few angles within a relatively narrow angular range are acquired. From these projection radiographs, a 3D representation of the structure of the imaged object can be reconstructed. However, since only "incomplete" information exists (i.e., not densely spaced projections over the full angular range), the reconstruction problem is difficult to solve.

The main problems that need to be addressed by a reconstruction algorithm in order to yield satisfactory image quality are (i) efficient separation of overlying tissue, (ii) enhancement of the contrast, particularly of small structures, and (iii) minimization of artifacts. In some advanced reconstruction algorithms, some form of re-projection consistency constraint is utilized (directly or indirectly) to obtain high-quality reconstructions. These algorithms include, for example, additive algebraic reconstruction techniques (ART), matrix inversion tomosynthesis (MITS), Fourier based reconstruction, and volumetric order statistics-based reconstruction. However, these algorithms are generally computationally intensive and/or not very flexible to use. For example, strategies for artifact management may be hard to integrate in these known algorithms of the prior art.

A need exists for an improved, computationally efficient and flexible method for reconstructing a 3D image of an object from a plurality of projection radiographs.

SUMMARY OF THE INVENTION

The present invention comprises a method of computing a reconstruction of the imaged volume that is equivalent to (in one embodiment), or approximates (in another embodiment) a reconstruction obtained by additive algebraic reconstruction techniques (ART). Generally, ART requires several iterations before a good image quality is obtained. In contrast, with the present invention, no backprojection/re-projection iteration of the dataset is required. The iterative update is replaced by a preprocessing step (filtering and linear combination), followed by a single backprojection step, thereby creating considerable computational savings. Furthermore, since the method does not involve a re-projection step, it is not required to reconstruct the full volume in the backprojection step, but instead the focus can be directed to the volume of interest, which may be a small region of the full imaged volume. In addition, the computational savings of the inventive method as compared to standard ART reconstruction allows the incorporation of more advanced processing schemes, while computing a reconstructed 3D representation of the imaged object in the time allotted, thus further improving the reconstructed image quality. For example, the present invention can be combined with additional artifact minimization (e.g., OSBP—order statistics-based backprojection) or contrast enhancing methods, while still maintaining a reasonable level of computational effort.

In accordance with the present invention, projection images are acquired of a volume of interest (which contains, for example, portions of an object or person) at a plurality of projection angles. Filtered versions of all projection images are then prepared and combined in a suitable way to from new images and the 3D imaged volume of interest is then reconstructed from the new images. One aspect of the present invention covers the design of optimal filters for this reconstruction approach.

Through the flexibility of the present method, a number of modifications can easily be derived, such as, for example, modifications that lead to reduced noise effects, or creating a filter for a "traditional" filtered backprojection type reconstruction.

The present invention is particularly useful, for example (but not by way of limitation) for producing reconstruction images of high quality in the context of tomosynthesis for chest and lung imaging. Numerous other uses of the present invention are possible as will be understood by persons of ordinary skill in the art.

The above and other objects, features, and advantages of the present invention are readily apparent from the following detailed description of the preferred embodiments for carrying out the invention when taken in accordance with the accompanying drawings.

DESCRIPTION OF PREFERRED EMBODIMENTS

Figure 1:
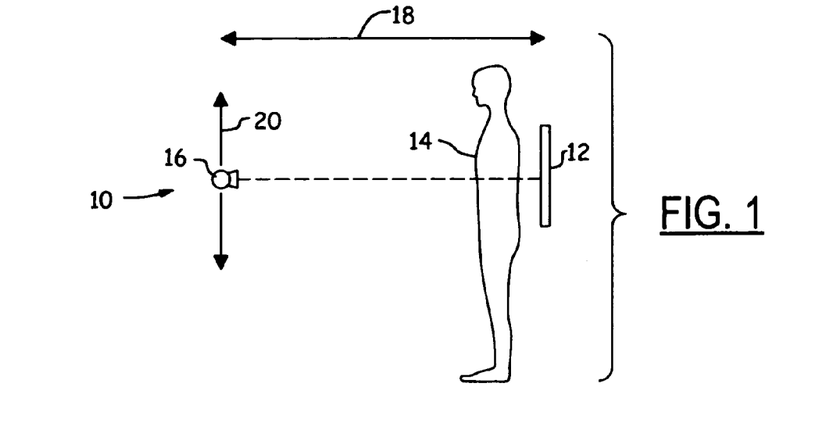
FIG. 1 shows the basic configuration of an exemplary tomosynthesis system.

Digital tomosynthesis is a three dimensional (3D) x-ray imaging technique, where typically only a few projection radiographs are acquired for varying positions of the x-ray tube with respect to the imaged object and the x-ray detector. FIG. 1 depicts an exemplary tomosynthesis system 10 used in a wall stand system for chest/lung imaging. In particular, the detector 12 and the imaged object (i.e., the patient) 14 are stationary, while the x-ray tube 16 is movable along a linear trajectory 20 at a constant distance 18 from the detector plane, in order to acquire projections from different view angles. The detector consists in this example of 2048×2048 pixels, with a pixel size of 200×200 µm, which translates into a detector size of about 41 by 41 cm. The tube-detector distance 18 (at the central tube position with respect to the detector) is about 180 cm, and the total range of motion of the tube is generally between about 31.5 and 131.0 cm. This corresponds to an angular range of ±5 to ±20 degrees, where 0 degrees corresponds to the central position of the tube.

Typically at least ten projection radiographs are acquired during a tomosynthesis acquisition, for tube positions covering the full angular range.

Although the present invention will be discussed relative to the system 10 shown in FIG. 1, it is to be understood that the present tomosynthesis reconstruction method is not constrained to this specific system, and can be used in other situations where the goal is to reconstruct 3D information about the imaged object/anatomy from relatively few projection radiographs. In particular, the detector specifications, as well as its position or orientation, may be different. Also, the detector may move during the acquisition, the x-ray tube may be moving along a non-linear trajectory, or in a different geometry (scan range, or distance to detector, etc.) than in the exemplary system shown, or multiple tubes and/or detectors may be employed.

In one embodiment of the present invention, the reconstruction algorithm comprises a number of steps. First, for each projection angle, the corresponding new image is formed as a linear combination of appropriately filtered versions of all, or a subset of all, acquired projection images. In this regard, the filters used will generally be different for each projection image to be filtered, and each projection angle. Then, a reconstruction of the imaged volume is completed from these new images by using simple backprojection. Each of the new images created in the first step is backprojected according to the associated projection angle/focal spot position.

If the acquisition geometry is (at least approximately) known beforehand, the filters that are used can be computed in advance. In addition, the filters can be chosen such that the obtained 3D reconstruction is essentially equivalent to a reconstruction obtained with a predetermined or pre-specified number of iterations in an equivalent standard ART reconstruction (or, such that the obtained 3D reconstruction is equivalent to the result obtained with standard ART after convergence). The filters can also be chosen to approximate such a solution, while having additional desirable properties (e.g., being computationally even more efficient, or offering improved noise suppression).

The present invention has a number of significant benefits, and is extremely flexible offering a wide variety of possible modifications. With the present invention, only a single backprojection operation per projection angle is required, without any re-projection. With ART, typically a large number of iterations are necessary in order to achieve a high degree of accuracy. With the present invention, however, only a modification of the used filters is required (according to the number of iterations used in ART) to obtain a reconstruction that is equivalent to a result obtained with a predetermined number of iterations used in ART. Generally, to obtain satisfactory results with the present invention, the filters will correspond to a relatively high number of iterations in standard ART. Thus, the present invention reduces the computational effort and can increase the speed of the computation significantly.

The present method is also robust with respect to inconsistent projection images. In standard ART, inconsistencies between different projection images can lead to "non-convergence" (e.g., limit-cycle type behavior) of the iterative reconstruction. Because the present inventive method is non-iterative, this problem does not arise.

Figure 2:
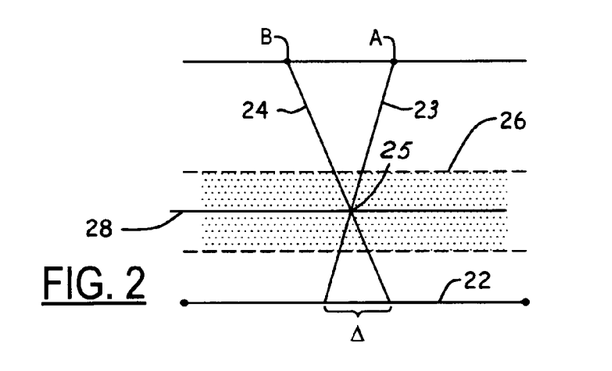
FIG. 2 illustrates the shift in the image of the center slice of the imaged volume with respect to different focal spot positions of the x-ray source.

The "exact version" of the approach according to the present invention requires N filtering steps for each of the N projection images (where N is the total number of acquired projection images). In addition, with the present invention, an approximation of the "exact" method can be obtained that speeds up the computation by replacing a filtered version of one projection image by a filtered version of another projection image, with a correspondingly modified filter. By doing this, the number of filtering operations can be reduced, since different filters acting on the same image can be combined into one. In general, the modification of the filters will consist of a simple shift/translation such that the position of the filter with respect to the projected central slice of the volume to be reconstructed remains constant. This is depicted in FIG. 2 where a filtered version of a projection image acquired with detector 22 and corresponding to focal spot A can be approximated by a filtered version of the projection image corresponding to focal spot B. In FIG. 2, the volume to be reconstructed is identified by reference numeral 26 and the central slice of the reconstructed volume is identified by reference numeral 28. By taking an arbitrary point 25 located on central slice 28, and by drawing logical lines 23 and 24 through the respective focal spot locations A and B and point 25, one can identify the distance $\Delta$ by which the projection of the point is shifted in the respective projections. Accordingly, a modified filter can be created by shifting the filter by distance $\Delta$. Filtering the projection image corresponding to focal spot B with the modified filter can serve as an approximation of filtering the projection image corresponding to focal spot A with the original filter. In the limit, this type of approach can be utilized to design filters for a filtered backprojection-type reconstruction in tomosynthesis, where every projection image is filtered (only once) and then backprojected, to form the reconstructed dataset. It is to be recognized that an alternative shift $\Delta$ can be determined with respect to a region of interest within the imaged object that does not coincide with the central slice 28 It is to be recognized, that there are also other ways to modify a filter such that the filtered version of one projection image can be approximated by a filtered version of another projection image with the modified filter.

The present reconstruction method can secure improved image quality in the reconstruction since there are no intermediate steps/iterations as in ART. The iteration steps in standard ART require interpolation of the image data and the data undergoes the associated potential loss of image detail in the backprojection and re-projection steps at every iteration. ART iterations also include a discretization in the z component/height, thereby potentially introducing artifacts in the reconstruction. The mechanism that leads to these artifacts is circumvented in the algorithm according to the present invention.

With the present invention, in addition to the original projection images, only the new images (i.e., the combinations of filtered versions of the projection images) need to be stored. This reduces the data storage requirements. Furthermore, if only a part of the full volume needs to be reconstructed, this can be accommodated. In ART, in contrast, in each iteration the whole volume needs to be reconstructed, stored, and re-projected, for use in the subsequent iteration step.

Since only a single backprojection step is utilized in the present invention, it can be combined with, for example, order statistics-based backprojection (OSBP) techniques for minimizing artifacts. OSBP could replace the simple backprojection step, but will in turn increase the computational burden in the backprojection. This makes it impractical for use in combination with standard ART, where many backprojection steps are required.

A reconstruction obtained with the "exact version" of the present method (which means that none of the "approximations" is used, which can speed up the computation), satisfies the re-projection consistency constraint, i.e., an iteration does not lead to a further improvement. However, when used in combination with OSBP, or some types of constraints (e.g., thresholding at pre-defined minimum and maximum values in the reconstruction) an iterative update using the present method can be applied with extremely few iterations to achieve convergence. In one embodiment, the constraint is applied after a first reconstruction is performed. Then, the reconstructed dataset is re-projected, the difference to the original projection images is taken, reconstructed, and then used to update the previously reconstructed dataset. This update can then be iteratively repeated.

The present reconstruction method offers the flexibility to partition the projection angles/focal spot positions into different subsets, to perform a reconstruction (according to the present invention) with respect to the projections associated with one of the subsets, and then iterate by alternatingly going through the different subsets, and updating the reconstructed volume. If the subsets of focal spots are sets of one, then the resulting iterative procedure is exactly the standard ART reconstruction strategy. If only one "subset" exists (which contains all the focal spots), then a one-step solution can be obtained, as set forth above. In other instances, "intermediate" cases can be obtained and used, for example, to trade off the computational load of each iterative update with the number of iterations needed, which makes it more efficient to exploit additional constraints.

Figure 7:
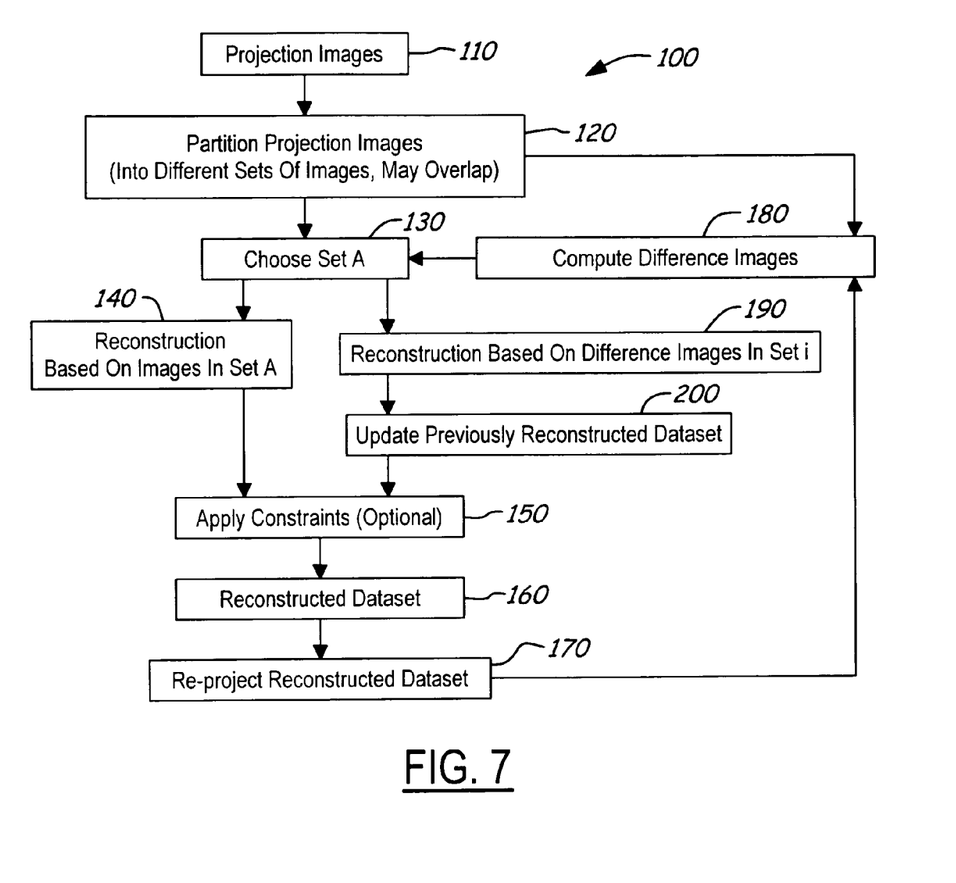
FIG. 7 is a flow diagram of another embodiment of the invention.

FIG. 7 is a flow diagram which illustrates another embodiment of the present invention. This embodiment is referenced generally by numeral 100 and includes an iterative update with a partition of the projection images into one or more sets of projection images.

In a first step, the projection images 110 are partitioned into one or more sets of projection images 120. Each projection image should be contained in at least one such set of projection images. Then one of these sets "A" is chosen 130, and a reconstruction is performed based on the images contained in this set 140. It is to be recognized that in the case where the projection images are partitioned into only one set of projection images containing all the images, then the reconstruction step is a one-step reconstruction as described above. An (optional) constraint is then applied 150 to the reconstructed three-dimensional information 160. The three-dimensional information is re-projected 170 and the difference images are then computed to the true projection images 180. A different set of images can now be selected and a reconstruction based on the corresponding difference images can be preformed 190. The thereby reconstructed three-dimensional information is used to update the three-dimensional information 200 obtained in the previous iteration step, to yield an improved three-dimensional dataset. By repeating these steps, further improved three-dimensional datasets are obtained.

Note that in these steps the different sets of projection images are typically cycled through so that all projection images contribute repeatedly to the iterative update step. It is also to be recognized that, if the sets of projection images are sets containing one projection image each, the iterative reconstruction as set forth corresponds to a standard ART reconstruction strategy. The iterative update using a partition of the projection images into sets of images is particularly useful in situations where a constraint is applied to the reconstructed dataset, followed by an iterative update. In this scenario, the computational load of each reconstruction step is smaller (as compared to the iteration using all projections), while the overall image quality may be comparable.

Since the filters used in the reconstruction according to the present invention are directly accessible (unlike in ART, where they are only implicitly defined), the filters can be modified, for example, in order to achieve a trade-off between reprojection consistency, and noise propagation. This may be particularly useful in cases where the amount of noise differs between projection images (e.g., due to a different x-ray technique), where for example only the filters applied to the "noisy" images need to be modified. Also, only the high-frequency characteristics of the filters can be utilized to obtain a reconstruction of the fine details (i.e., high frequency content) in the imaged volume. In the situation where the present method is combined with OSBP, the filters can be modified to counteract some of the expected "loss in reprojection consistency" due to the OSBP operations. (With OSBP, backprojected values are generally not taken into account at every height in the reconstructed volume. Larger structures, corresponding to lower frequencies, are typically taken into account at a larger fraction of the height of the reconstructed volume than smaller structures, corresponding to higher frequencies. The filters can be adjusted to counteract these effects to some degree, thereby maintaining a "better" re-projection consistency).

For a linear tube trajectory, for example parallel to the columns of the detector, the filters are one-dimensional (1D), acting on columns of the image, and are identical for all columns of the image. Generally, in cases where the tube trajectory is linear with a constant height above the detector plane, the filters that are derived according to the present invention are 1-D filters, acting on lines of the images that are parallel to the tube trajectory.

In situations where the x-ray tube trajectory is essentially linear, the filters according to the present invention can be combined with an additional transversal filtering component, in order to further enhance the reconstructed image quality.

Also, the reconstruction method of the present invention can be used for quantitative reconstruction, since it satisfies the re-projection constraint.

The filters that are used in the reconstruction method of the present invention can be derived in various ways. In particular, in one embodiment, the filter construction will proceed in iterative steps, where each step mimics an iterative update step in a corresponding ART reconstruction. The filter derivation is motivated by the fact that a simple backprojection (of a single projection image) into a volume of constant thickness, followed by re-projection (with respect to a different focal spot position) generates an image that can also be (approximately) generated from the initial projection image by a linear filtering step with an appropriate one-dimensional (1D) boxcar filter. The combination of a backprojection step followed by a re-projection step (acting on a single projection image) can therefore be replaced by a simple convolution with a suitable filter/kernel.

Additive ART essentially consists of a sequence of iterative backprojection/re-projection steps, combined with appropriate add/subtract operations. With the present invention, all these operations are collapsed into the construction of a set of appropriate filters such that filtering the projection images and suitably combining the filtered images, followed by a simple backprojection, is equivalent to additive ART. For every projection image a new image is formed as a (weighted) sum of appropriately filtered versions of all acquired projection images. Then, a backprojection step is performed using these new images, in order to obtain a reconstruction that is equivalent to one obtained with additive ART. This approach is also extremely flexible. For example, computationally less expensive approaches that approximate this exact result can easily be developed within the present framework.

Figure 3:
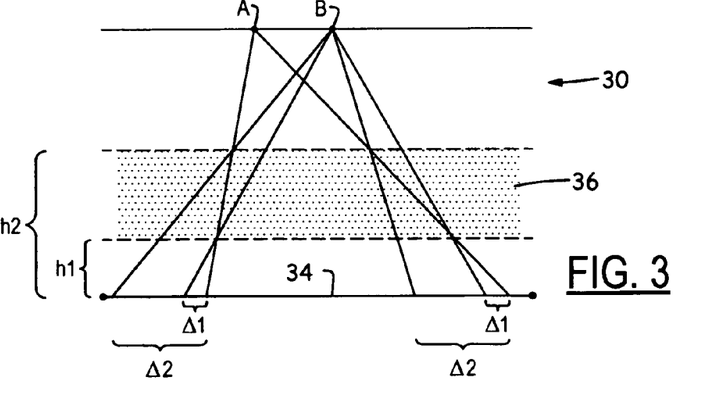
FIG. 3 illustrates the situation where the backprojection/reprojection can be approximated by a convolution with a boxcar filter.

In tomosynthesis, the focal spot positions are typically assumed to be (at least approximately) at a constant height above the detector. From this assumption it follows that, for any given point located in a plane parallel to the detector, a line connecting the projections of this point with respect to two different focal spot positions onto the detector has a predetermined length and orientation, both depending only on the height of the plane, and the relative location of the considered focal spots, but not depending on the specific point within the plane. This is shown in FIG. 3 and identified generally by the reference numeral 30. Using now the fact that in ART reconstruction for tomosynthesis, the volume to be reconstructed will typically be limited by a minimum and a maximum height above the detector, and the fact that the projection of a line is a line, it follows that backprojection with respect to one focal spot, followed by re-projection with respect to another focal spot, is (approximately) equivalent to a convolution with an appropriate 1D boxcar filter.

As shown in FIG. 3, for any point at a given height above the detector 34, the projections with respect to two focal spots A and B are at a constant distance from each other, independent of the specific point chosen. For example, the projections of any point at height h1 are at a distance of $\Delta 1$ from each other. It follows that a backprojection with respect to focal spot A, into the volume 36 between heights h1 and h2, followed by a re-projection with respect to focal spot B, is (approximately) equivalent to a convolution with a boxcar filter. The boxcar filter has a length of ($\Delta 2 - \Delta 1$), and an offset of ($\Delta 1 + \Delta 2$)/2 (as compared to a "centered" boxcar filter of the same length).

As indicated above, the construction of the filters relies on the fact that, together with an assumed minimum and maximum height above the detector for the volume containing the imaged object, a backprojection of a single image (associated with one projection angle), followed by a re-projection (with respect to a second projection angle) is equivalent to filtering the image with a boxcar filter of a given length and offset, and with integral one. The exact filter, however, is not a boxcar filter, but has a non-constant amplitude. However, a boxcar filter can generally be used as a good approximation.

A standard ART strategy is, for example, to perform a simple backprojection based on a single projection image. The resulting 3D dataset represents the initial reconstruction. The reconstructed volume/dataset is then re-projected with respect to a projection angle corresponding to a second projection, and the difference between the true second projection image, and the re-projected image is computed. This difference image is then backprojected (according to the projection angle corresponding to the second projection image) and added to the initial reconstructed volume. The quality of the reconstruction is improved by iteratively using the same steps: re-project the current reconstruction (with respect to some projection angle), backproject the difference between true projection image (for that projection angle) and re-projected image, and add to the current reconstruction to obtain an updated reconstruction. Formally, this strategy can be written in the following form, $$O^{(n)} = O^{(n-1)} + B_{i(n)}(I_{i(n)} - P_{i(n)}(O^{(n-1)})) \qquad (1)$$

where $O^{(n)}$ denotes the estimated reconstructed object at the n-th iteration, $I_{i(n)}$ denotes the projection image corresponding to projection angle i(n), and $P_{i(n)}$ and $B_{i(n)}$ are the associated projection and back-projection operators, respectively. The initial condition is usually chosen to be $O^{(0)}=0$.

There are various ART strategies, which differ mainly in the order in which the different projection images are visited, the chosen weight for the update term, and whether each update is based on a single, or multiple images (in the multiple image case, the backprojected images, or back-projected differences, are generally averaged). However, these different strategies are aimed solely at improving the speed of convergence, and they all converge to the same resulting reconstruction. For this reason, any one of these strategies can be used to derive the filters according to the present invention.

To explicity derive the filters, the specific strategy of the example given above can be followed, in which case one obtains (by rewriting $O^{(n-1)}$ according to the iteration Equation (1)) an iterative update of the form:

$$O^{(n)} = O^{(n-2)} + B_{i(n-1)}(I_{i(n-1)} - P_{i(n-1)} - (O^{(n-2)})) + B_{i(n)}(I_{i(n)} - P_{i(n)}(O^{(n-2)} + B_{i(n-1)}(I_{i(n-1)} - P_{i(n-1)}(O^{(n-2)})))) \qquad (2)$$

As stated above, backprojection (with respect to one projection angle), followed by re-projection (with respect to a second projection angle) is essentially equivalent to filtering with the corresponding boxcar filter. If the filtering operator corresponding to a backprojection with respect to angle i, followed by a reprojection with respect to angle j is denoted with K(i, j), then the previous equation can be rewritten as:

$$O^{(n)} = O^{(n-2)} + B_{i(n-1)}(I_{i(n-1)} - P_{i(n-1)}O^{(n-2)}) + B_{i(n)}((I_{i(n)} - P_{i(n)}(O^{(n-2)} + B_{i(n-1)}(I_{i(n-1)} - P_{i(n-1)}(O^{(n-2)})))) = O^{(n-2)} + B_{i(n-1)}(I_{i(n-1)} - P_{i(n-1)}(O^{(n-2)})) + B_{i(n)}(I_{i(n)} - P_{i(n)}O^{(n-2)}) - K(i(n), i(n-1))I_{i(n-1)} + K(i(n), i(n-1))P_{i(n-1)}(O^{(n-2)})) \qquad (3)$$

By successively expressing the reconstructions $O^{(n-2)}$ etc. by "previous" reconstructions, and by rewriting any combination of back-projection/re-projection $P_jB_i$ as the corresponding filtering operator K(i, j), together with the initial condition $O^{(0)}=0$, the final equation is obtained where $O^{(n)}$ is expressed as a linear combination of backprojected images, each image consisting of a linear combination of appropriately filtered versions of the original projection images. The involved filters are expressed as the (weighted) sum of combinations of the elementary filters K(i, j).

By letting the "iteration number" n increase (for example to n=10N where N is the number of projection images—a large n ensures convergence of the equivalent ART reconstruction), the filters F can be obtained that are required to compute the reconstructed dataset:

$$O^{(n)} = \sum_i B_i \left( \sum_j F^{(n)}(i, j) I_j \right) \qquad (4)$$

which is essentially identical to the result obtained after n iterations of additive ART (using the identical update strategy as outlined above).

The above suggests to create the filters F by successively substituting $O^{(n-2)}$ etc. in Equation (1), thus obtaining a polynomial in K(i, j) for each of the filters F, and then explicitly computing each F from the "elementary filters" K(i, j). Using this approach, and using the approximation of the filters K as boxcar filters, the filters F can also be explicitly expressed as piecewise polynomials, or as B-splines.

A second strategy to derive the filters F, for example, can be to assume a representation of Equation (4) for $O^{(n)}$, and to use the update Equation (1), which will provide a recursive method to compute the filters F(i, j). Specifically, we have:

$$O^{(n)} = O^{(n-1)} + B_{i(n)}(I_{i(n)} - P_{i(n)}O^{(n-1)}))$$ (5)

$$= \sum_i B_i\left(\sum_j F^{(n-1)}(i, j)I_j\right) + B_{i(n)}\left(I_{i(n)} - P_{i(n)}\sum_i B_i\left(\sum_j F^{(n-1)}(i, j)I_j\right)\right)$$

$$= \sum_i B_i\left(\sum_j F^{(n-1)}(i, j)I_j\right) + B_{i(n)}\left(I_{i(n)} - \sum_i P_{i(n)}B_i\left(\sum_j F^{(n-1)}(i, j)I_j\right)\right)$$

$$= \sum_i B_i\left(\sum_j F^{(n-1)}(i, j)I_j\right) + B_{i(n)}\left(I_{i(n)} - \sum_i (K i(n), i)\left(\sum_j F^{(n-1)}(i, j)I_j\right)\right)$$

and it follows that:

$$F^{(n)}(i,j) = F^{(n-1)}(i,j) \text{ for } i \neq i(n),$$ (6)

$$F^{(n)}(i,j) = F^{(n-1)}(i,j) - \Sigma_k K(i,k) F^{(n-1)}(k,j) \text{ for } i = i(n), j \neq i(n),$$ (7)

$$F^{(n)}(i,j) = F^{(n-1)}(i,j) + \delta \Sigma_k K(i,k) F^{(n-1)}(k,j) \text{ for } i = i(n), j = i(n).$$ (8)

where $\delta$ denotes the Dirac impulse.

As noted above, different ART update strategies can be used as well, leading to modifications of these recursive definitions of the filters F. Also, since all additive ART strategies converge to the same end result (i.e., the minimum norm solution to the projection equation), there exists a set of filters that correspond to that solution, and it is possible to derive these filters directly, for example by using a fixed point condition for the recursive update equation for the filters. This condition leverages the fact that, once the iteration has converged, an additional update step will leave the filters unchanged.

One way to derive the filters F(i, j) which can be used in the method of the present invention to compute a reconstructed volume that is equivalent to a reconstruction obtained with ART after convergence is to utilize the re-projection consistency constraint that the corresponding reconstruction (theoretically) satisfies. This constraint says that the reconstructed volume, when reprojected with respect to one of the considered focal spot positions, results in a projection image that is identical to the true projection image for that focal spot position. Using a presentation as in equation (4), this constraint can be expressed in the following form, $$I_k = P_k O = P_k\left(\sum_i B_i\left(\sum_j F(i, j)I_j\right)\right)$$

(for all k). Writing this expression (for all k) now in matrix form, one obtains $$\begin{pmatrix} I_1 \\ \vdots \\ I_N \end{pmatrix} = \begin{pmatrix} P_1 \\ \vdots \\ P_N \end{pmatrix} \cdot (B_1 \ldots B_N) \cdot \begin{pmatrix} F(1,1) & \cdots & F(1,N) \\ \vdots & \ddots & \vdots \\ F(N,1) & & F(N,N) \end{pmatrix} \cdot \begin{pmatrix} I_1 \\ \vdots \\ I_N \end{pmatrix} =$$

$$\begin{pmatrix} K(1,1) & \cdots & K(1,N) \\ \vdots & \ddots & \\ K(N,1) & & K(N,N) \end{pmatrix} \cdot \begin{pmatrix} F(1,1) & \cdots & F(1,N) \\ \vdots & \ddots & \\ F(N,1) & & F(N,N) \end{pmatrix} \cdot \begin{pmatrix} I_1 \\ \vdots \\ I_N \end{pmatrix}$$

and it follows that the filters F(i, j) can be determined as the entries of the matrix that is the "inverse" of the matrix containing the elementary filters K(i, j). One way to obtain the filters F(i, j) uses a Fourier space representation of the filters K(i, j) and F(i, j). Using this representation, one obtains a separate equation (corresponding to the previous equation) for each frequency in Fourier space, and the filters F(i, j) (in their Fourier space representation) can be easily determined by computing for each frequency the inverse (or, generalized inverse, or Moore-Penrose inverse, for example with the help of a singular value decomposition) of the matrix containing the corresponding Fourier coefficients of the filters K(i,j). It is to be recognized, that other approaches to determine the filters F(i, j) that will lead to a reconstruction that is equivalent to a reconstruction obtained with ART after convergence can be used as well.

Figure 4A:
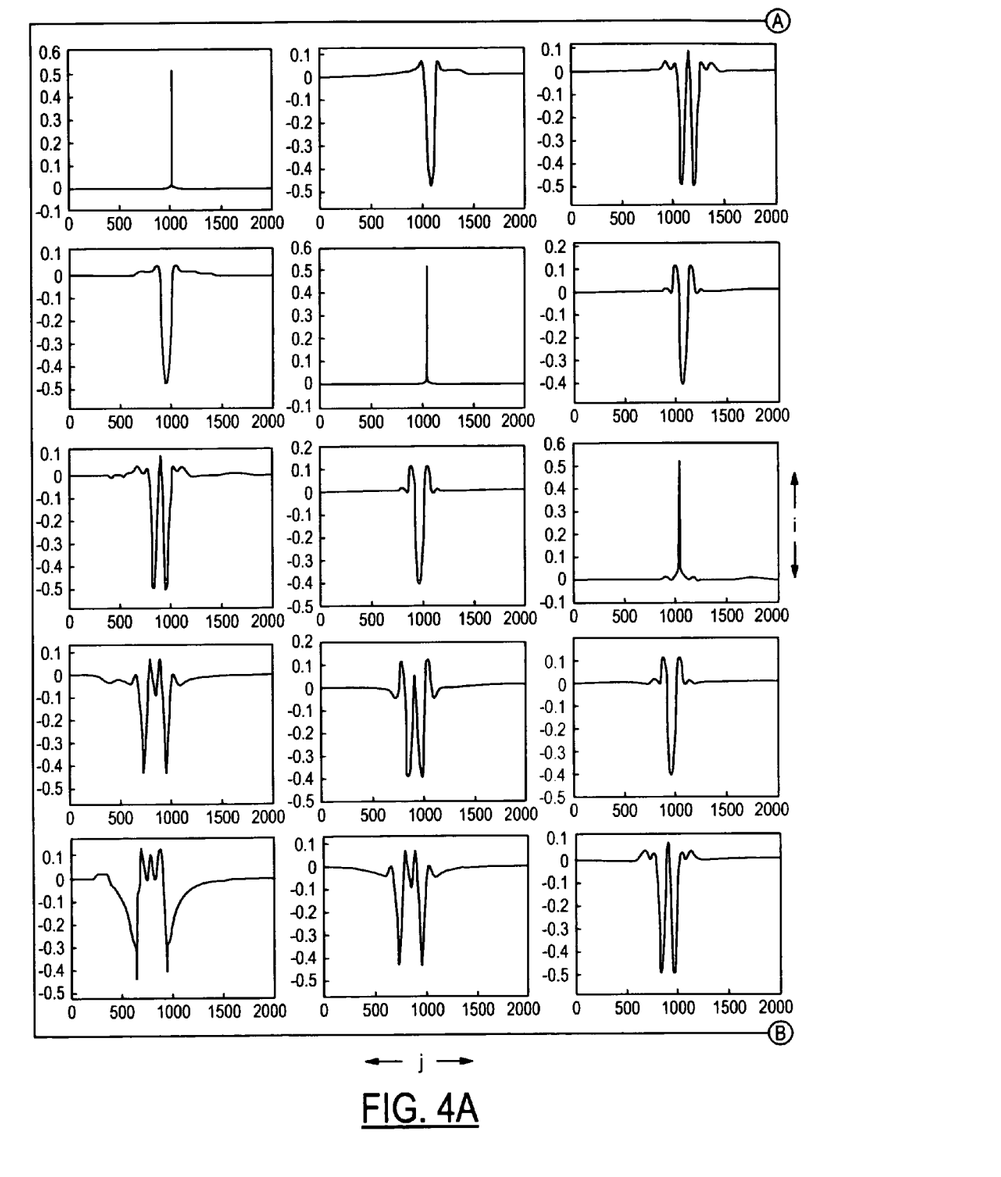
FIG. 4 illustrates examples of filters for a reconstruction from five projections.
Figure 4B:
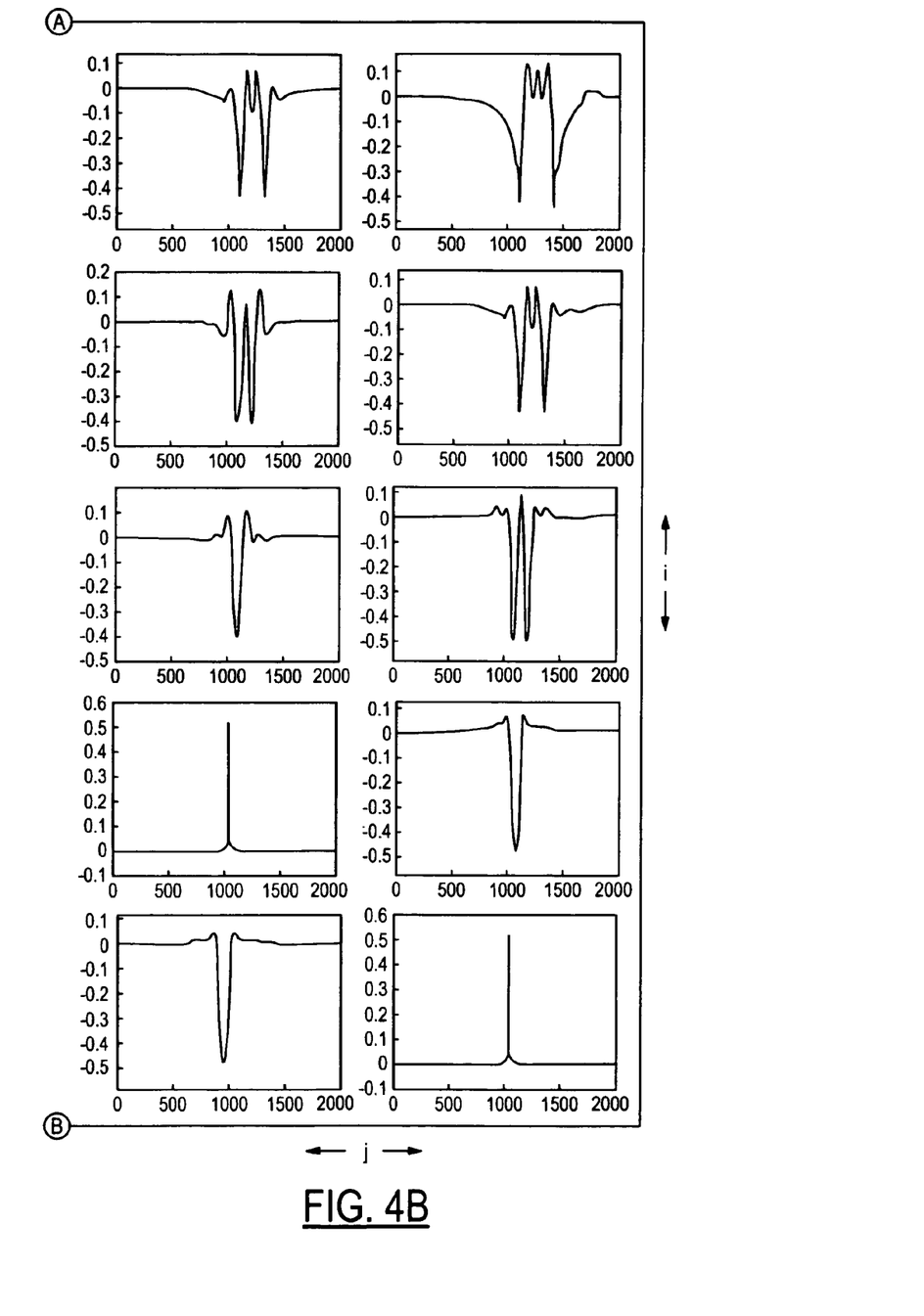
Figure 5A:
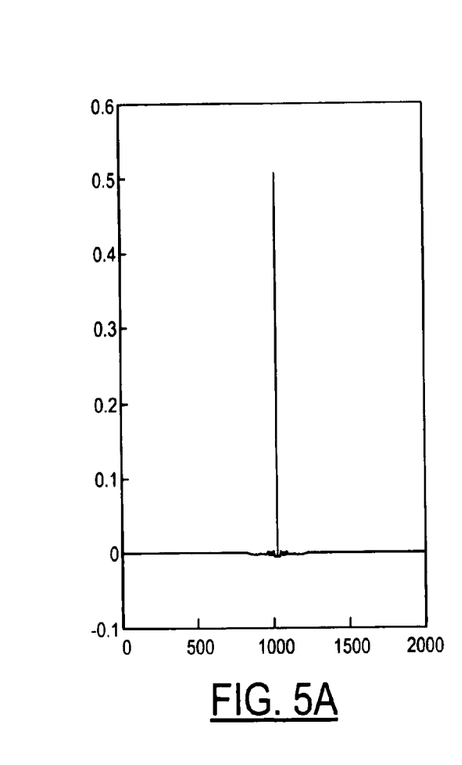
FIG. 5 illustrates filters derived from the filters depicted from FIG. 4.
Figure 5B:
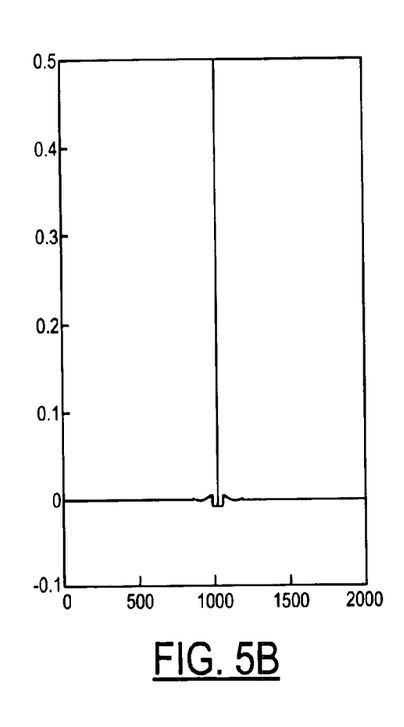
Figure 5C:
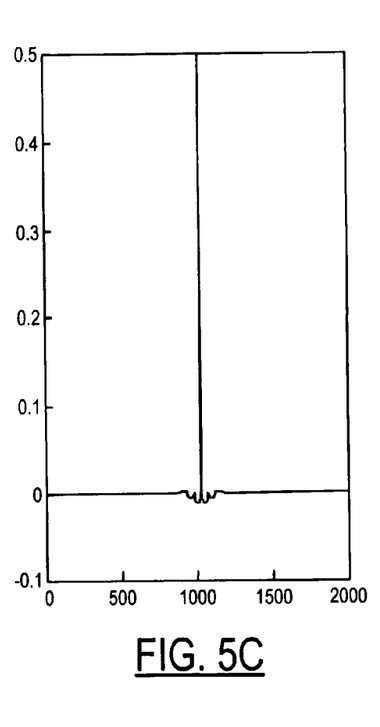
Figure 5D:
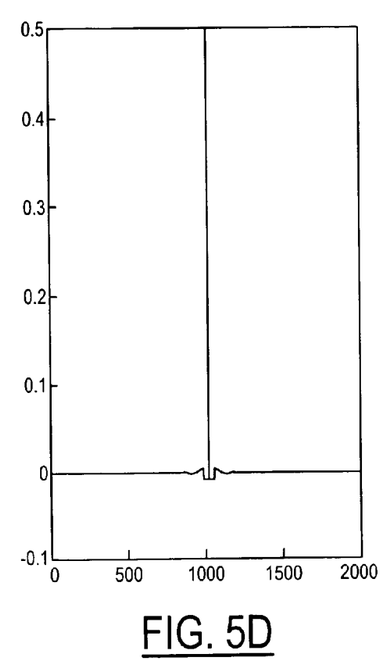
Figure 5E:
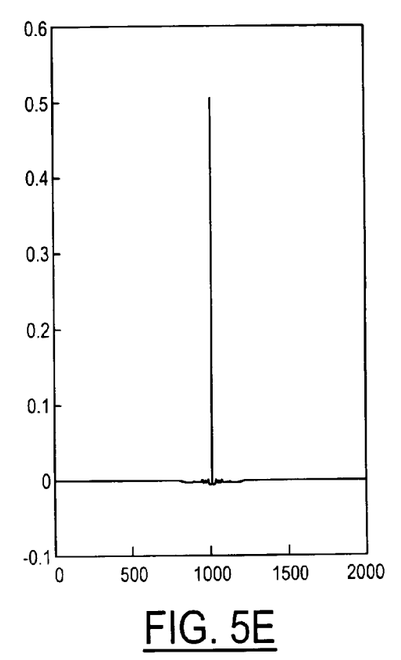

FIG. 4 depicts examples of filters F(i, j), for a tomosynthesis scenario where five different projections are acquired and used for the reconstruction, with a tube trajectory on a straight line, parallel to the columns of the detector. In this scenario, all filters are ID, and aligned with the pixel columns of the projection images. In this scenario, a new image "i" will be computed as the sum of filtered versions of all projection images "j", where each image "j" is filtered with the corresponding filter F(i, j). The reconstructed volume is then obtained, for example, by backprojecting and averaging these new images.

$$\sum_j F(i, j)I_j.$$

It should be appreciated that, while the elementary filters K(i, j) are ID filters, the filters F(i, j) will typically be 2D (two-dimensional) dimensional) filters. Only in the case when the tube trajectory is linear (i.e., the tube positions for all projections are located on a line) and at a constant height above the detector plane will the filters F(i, j) be 1D filters.

As mentioned above, from the filters F(i, j), filters can be derived that can be used in a more standard filtered backprojection type reconstruction, where each image is only filtered once, and then backprojected. One example of such filters derived from the filters shown in FIG. 4, is shown in FIG. 5. The filters shown in FIG. 5 correspond to a standard filtered backprojection type reconstruction and were derived from the filters depicted in FIG. 4. In this scenario, only a single filter corresponding to each projection image is depicted. After the filtering step, the volume of interest is reconstructed using a backprojection operation.

Figure 6:
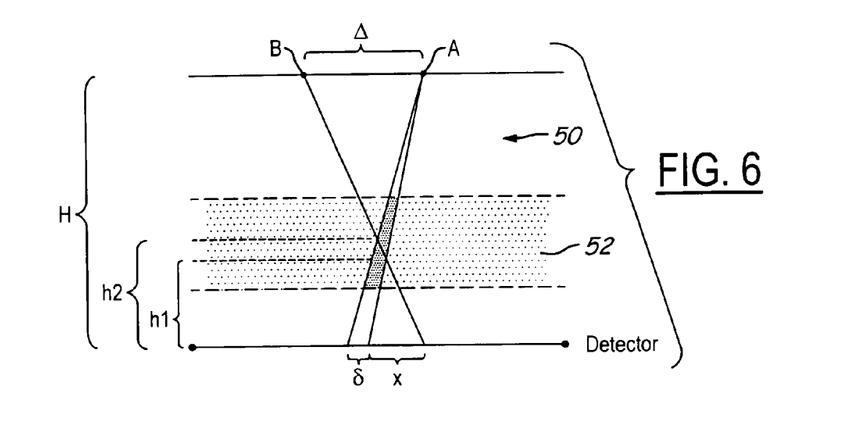
FIG. 6 illustrates the derivation of an exact filter that can be used as a building block to determine the filters used in the reconstruction.

As mentioned above, suitable boxcar filters represent generally satisfactory approximations of the elementary filters K(i, j). If even better accuracy of the reconstruction is required, the exact filters K(i, j) can be used. FIG. 6 illustrates the derivation of an exact filter corresponding to a backprojection with respect to one focal spot, followed by a re-projection with respect to a second focal spot. Simple backprojection of a single pixel (the pixel is indicated by the interval of length δ) with respect to the focal spot position A assigns to each location within the intersection of the "backprojection cone" and the volume 52 to be reconstructed a constant value (given by the image value at that pixel, divided by the height/thickness of the volume of interest). It is assumed that the image values are normalized with respect to the pathlength of each ray through the volume of interest. That is, in the normalized image domain, a ray through a homogeneous material of constant thickness will generate a constant image value, independent of the location of the pixel, or the incident angle of the specific ray. With these assumptions, the re-projection (with respect to focal spot B) of this backprojected pixel, at a given location which is defined by the offset "x" from the original pixel is the difference h2–h1, i.e., the height difference between the points where the ray enters and exits the backprojected "cone" associated with that pixel.

From FIG. 6, the specific elementary filter K can be determined. Specifically, it can be seen that $$h_2 = \frac{(\delta + x)H}{\Delta + \delta + x}, \text{ and } h_1 = \frac{xH}{\Delta + x}, \text{ and therefore} \quad (7)$$

$$h_2 - h_1 = \frac{H(\delta + x)(\Delta + x) - Hx(\Delta + \delta + x)}{(\Delta + \delta + x)(\Delta + x)}$$

$$= \frac{H\delta\Delta}{(\Delta + \delta + x)(\Delta + x)}$$

$$= \frac{H\delta\Delta}{(\Delta + x)^2 + \delta(\Delta + x)}$$

$$= \frac{H\delta\Delta}{(\Delta + x)^2}$$

where the last line is an approximation which is valid in the case that δ is small as compared to Δ, which is generally true. This previous equation defines the kernel K exactly, for all "x" such that h1 and h2 are inside the volume of interest. It is also clear from FIG. 5 how the "filter boundaries" can be derived. Obviously the kernel K is zero for all "x" such that neither h1 nor h2 are contained in the volume of interest, while both "ramp-up" and "ramp down" of the filter are exactly one pixel wide. Furthermore one can see that, in the case where the volume of interest is "close to the detector", i.e., for "x" small as compared to Δ, the boxcar filter is indeed a good approximation of the filter K. It is also obvious from this derivation that the filter K is shift-invariant, which is then also true for the filters F.

While the invention has been described in connection with one or more embodiments, it is to be understood that the specific processes and procedures which have been described are merely illustrative of the principles of the invention, numerous modifications may be made to the subject matter described without departing from the spirit and scope of the invention as defined by the appended claims.

What is claimed is:

1. A method of reconstructing a three-dimensional information about the structure of an object within a volume of interest from projection images acquired by a digital tomosynthesis system having an x-ray source configured to emit x-rays from different positions relative to a detector and said volume of interest, said method comprising:
    acquiring projection images of said volume of interest;
    preparing new images by processing said projection images, wherein said processing comprises preparing a filtered version of at least one of said projection images wherein each of said new images is the sum of filtered versions of all of said projection images and wherein for each new image, and for each projection image that contributes to that new image, there is a specifically derived filter; and
    backprojecting said new images.

2. The method as described in claim 1 wherein said filtered versions are prepared with at least one filter which depends on the height of the imaged volume of interest above the detector plane.

3. The method as described in claim 2 wherein said height comprises the minimum and the maximum height of the volume of interest.

4. The method as described in claim 1 wherein said filtered versions are prepared with at least one filter which depends on the local spot position corresponding to the image to be filtered.

5. The method as described in claim 1 wherein said filtered versions are prepared with at least one filter which depends on a focal spot position.

6. The method as described in claim 1 wherein said filtered versions are prepared with at least one filter derived using exact elementary filters.

7. The method as described in claim 1 wherein said filtered versions are prepared using an approximation of the exact elementary filter.

8. The method as described in claim 1 wherein said filter versions are prepared with a filter derived using a boxcar filter.

9. The method as described in claim 1 wherein said filtered versions are prepared with at least one filter corresponding to ART after a prespecified number of iterations.

10. The method as described in claim 1 wherein said filtered versions are prepared with at least one filter corresponding to ART after convergence.

11. The method as described in claim 1 wherein said filtered versions are prepared with at least one filter which comprises a combination of several filters, wherein the computational effort is reduced.

12. The method as described in claim 1 further comprising the step of selecting at least one filter to use for the filtered versions.

13. The method as described in claim 12 wherein said filter is selected corresponding to a prespecifed number of iterations in an ART reconstruction.

14. The method as described in claim 12 wherein said filter is selected corresponding to a prespecified number of iterations in an ART reconstruction after convergence.

15. The method as described in claim 1 further comprising the step of reconstructing the imaged volume of interest from said filtered versions.

16. The method as described in claim 1 wherein each of said new images is a filtered version of the corresponding projection image.

17. The method as described in claim 1 wherein at least one of said new images is a linear combination of filtered versions of at least two projection images.

18. The method as described in claim 1 wherein said backprojecting comprises OSBP backprojection.

19. The method as described in claim 1 further comprising the step of applying at least one of minimum and maximum constraint values to the reconstructed three-dimensional information.

20. The method as described in claim 1 further comprising the step of applying geometric constraints to the reconstructed three-dimensional information.

21. The method as described in claim 1 further comprising the step of iteration of the reconstruction of the three-dimensional information.

22. The method as described in claim 1 further comprising iterating the reconstruction of the three-dimensional information with at least one iterative update.

23. The method as described in claim 22 wherein each iterative update comprises:
    re-projecting, for one or more projection images, the three-dimensional information of a volume of interest according to the associated projection geometry;
    computing the difference image of the re-projected image to the corresponding acquired projection image;
    reconstructing a three-dimensional information of the volume of interest based on the difference images; and
    updating the previously reconstructed three-dimensional information of the volume of interest with the three-dimensional information based on the difference images.

24. The method as described in claim 22 further comprising a partition of the projection images into sets of projection images, each of said iterative updates being based on the projection images or difference images corresponding to one or more sets of projection images.

25. The method as described in claim 24 where each projection image is contained in at least one set of projection images.

26. The method of claim 24 where each projection image is contained in exactly one set of projection images.

27. The method of claim 24, where at least one iterative update is performed for each of the sets of projection images.

28. A method of reconstructing a three-dimensional information of a volume of interest from projection images acquired by a digital tomosynthesis system having an x-ray source configured to emit x-rays from different positions relative to a detector and said volume of interest, said method comprising:
    acquiring projection images of said volume of interest;
    selecting at least one filter to prepare filtered versions by using at least one specifically derived filter for each of said projection images;
    preparing new images, wherein said preparing comprises preparing filtered versions of each of said projection images; and
    backprojecting said new images.

29. The method as described in claim 28 wherein said filter is selected corresponding to a given number of iterations in an equivalent standard ART reconstruction.

30. The method as described in claim 28 wherein said filter is selected corresponding to a standard ART reconstruction after convergence.

31. The method as described in claim 28 wherein N filtering steps are utilized for each of the N projection images, wherein N is the number of acquired projection images.

32. The method as described in claim 31 wherein each of said new images is a linear combination of filtered versions of all projection images.

33. The method as described in claim 32 wherein at least one filtered version of a projection image is replaced by a filtered version of a different projection image.

34. The method as described in claim 33 wherein said replacement filtered versions comprise shift-translation of said original filtered versions with the position of the filter with respect to a central slice of the volume of interest remaining constant.

35. The method as described in claim 28 further comprising the step of combining said backprojecting step with OSBP techniques, whereby artifacts are minimized.

36. The method as described in claim 28 further comprising the step of setting minimum and maximum constraint values in said reconstruction.

37. The method as described in claim 28 wherein the filtered versions are prepared with filters that suppress noise in the images.

38. The method as described in claim 28 wherein the filtered versions retain only the high frequency content of said projection images.

39. The method as described in claim 28 wherein the x-ray trajectory is substantially linear and said filtered versions are prepared using said filters combined with transversal filtering components.

40. The method as described in claim 28 wherein the x-ray trajectory is substantially linear and said filtered versions are prepared using substantially one-dimensional filtering components.

41. The method as described in claim 28 wherein said filtered versions are prepared using a boxcar filter.

* * * * *